United States Patent [19]

Stemp

[11] 3,853,442
[45] Dec. 10, 1974

[54] APPARATUS FOR PREPARING SHEET MATERIAL
[75] Inventor: Peter John Stemp, Surrey, England
[73] Assignee: Redland Bricks Limited, Surrey, England
[22] Filed: Dec. 29, 1972
[21] Appl. No.: 319,642

[30] Foreign Application Priority Data
Jan. 3, 1972 Great Britain .................. 000159/72

[52] U.S. Cl.................. 425/112, 425/514, 425/520
[51] Int. Cl............................................... B29d 7/14
[58] Field of Search.......... 425/DIG. 200, DIG. 201, 425/83, 92, 367, 335, 364, 394, 373, 404, 425, 110, 112, 363, 510, 371, 372, 514, 520; 264/175, 109; 100/153, 154

[56] References Cited
UNITED STATES PATENTS
2,230,880  2/1941  Brown.................................... 425/83
2,961,361  11/1960  Dennis................................. 425/83 X
3,464,182  9/1969  Nichols...................... 425/DIG. 201
3,600,747  8/1971  Mc Carty.......................... 425/367 X
3,676,268  7/1972  Brandenburg et al. ......... 100/154 X Primary Examiner—Francis S. Husar
Assistant Examiner—David B. Smith
Attorney, Agent, or Firm—Young & Thompson

[57] ABSTRACT

The apparatus is for the preparation of sheet materials containing resin, fibres and particulate material as a homogeneous mass. The apparatus has a continuously moving conveyor belt. The belt can be lined to protect the apparatus with a barrier material such as cellophane, and the homogeneous material is deposited on to it. A second layer of cellophane can cover the material before it is initially compacted or compressed under a nip roller. The material is further compacted under pressure from a train of reciprocating rollers moving up and down a length of the conveyor belt above a supporting plate to produce a uniform sheet of material. After complete compaction the material is cut, removed from the conveyor belt and cured.

14 Claims, 5 Drawing Figures

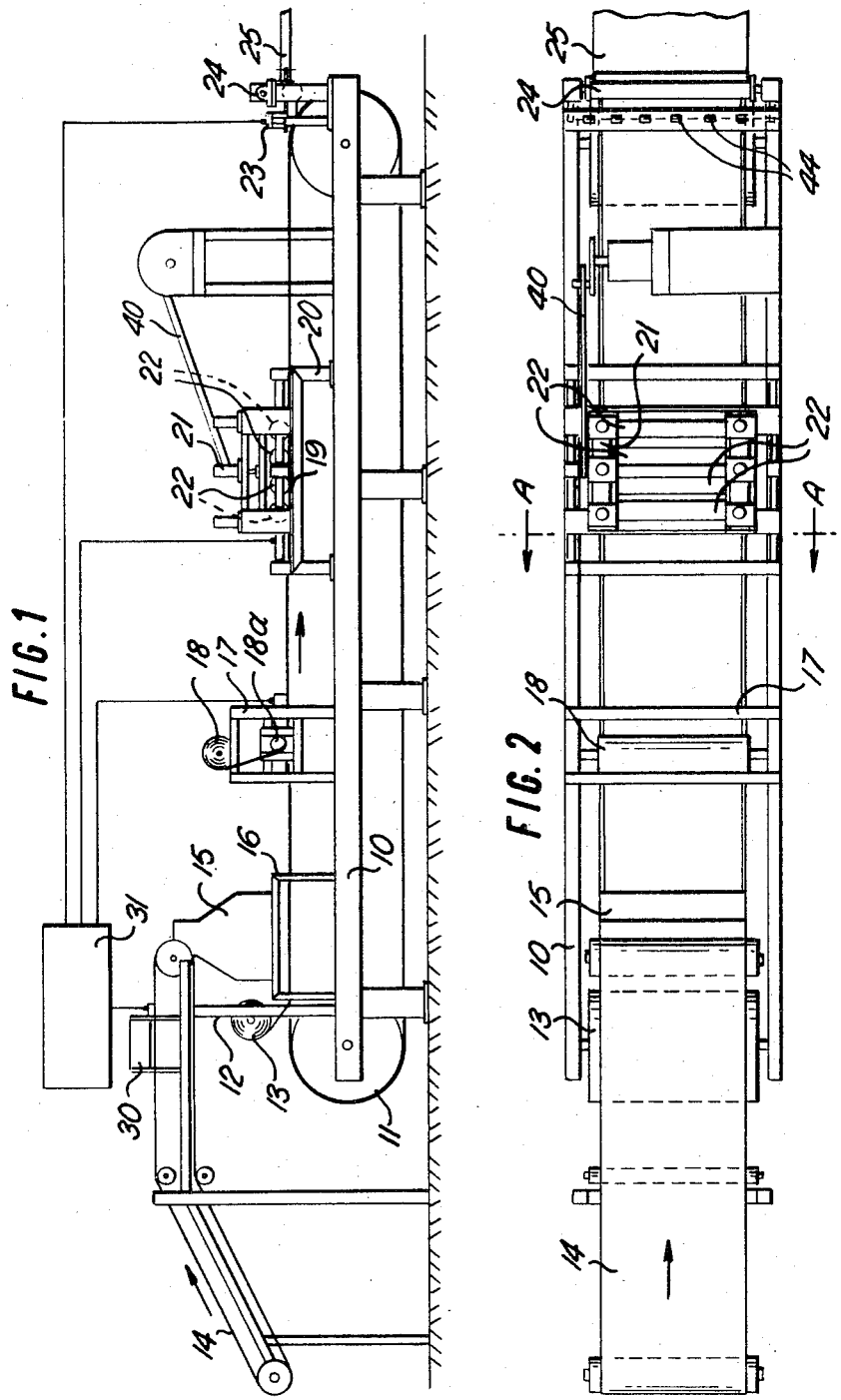

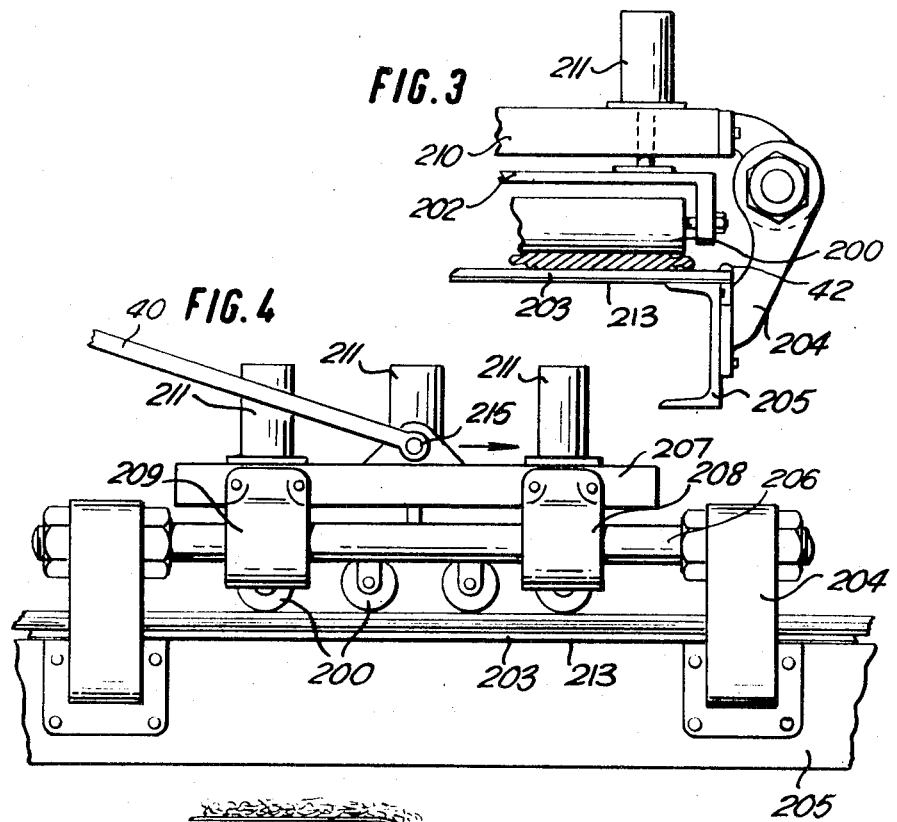
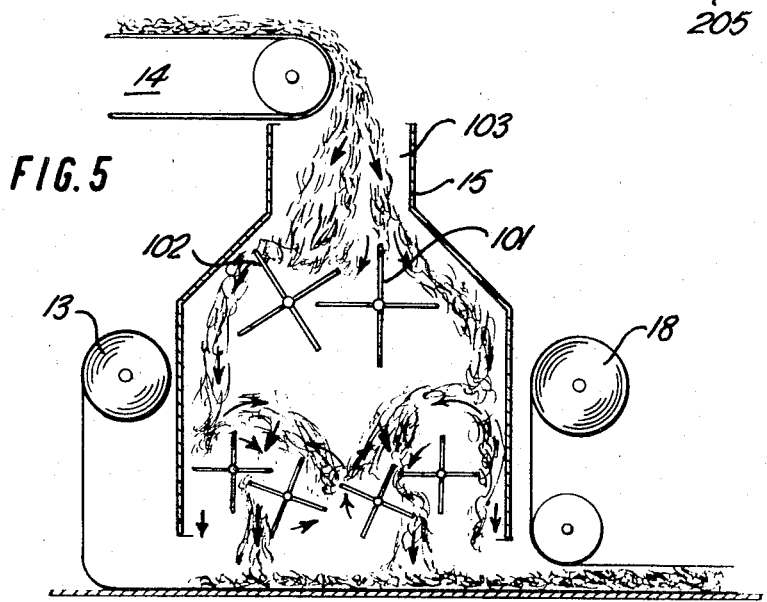

APPARATUS FOR PREPARING SHEET MATERIAL

BACKGROUND OF THE INVENTION

1. Field of the Invention

The present invention relates to a method and an apparatus for preparing sheet materials, especially sheet materials made from homogeneous mixtures of resin, fibre and particulate mineral material.

2. Description of Prior Art

Resin when used as binder or sealant is an expensive material. Also, large amounts of resin are required to produce a product having acceptable strength and durability. Mineral fibrous materials are also expensive when used in large amounts for the production of a sheet material.

In our U.K. Patent No. 1156205, we describe a moulding material which has good strength and durability characteristics yet only uses a small amount of resin and a small amount of fibre to obtain these special characteristics.

One of the problems which we have faced in producing a stone-sheeting material is the successful mixing of the materials into a homogeneous mass. When a homogeneous mass has been obtained, a further problem is maintaining the homogeneous nature of the mixture whilst producing the sheet. To obtain maximum strength in the sheet, we have found that it is necessary to cause the fibrous material to lie in the plane of the sheet.

A further problem encountered with the process described in our U.K. Patent No. 1156205 is removal of air spaces in the dough. During the homogeneous mixing process the dough is fluffed up and has a woolly nature. The solution put forward to overcome this problem in our earlier patent specification is to pass the fluffy dough repeatedly through a pair of nip rollers in a similar manner to passing washed clothes through a mangle. Unfortunately air bubbles were not removed in a satisfactory manner and still provided weak spots in the sheeting material. To try and meet this problem further pressure at the nip rollers was applied to the sheeting material but without success.

The major objections to this proposal are from a handling point of view. The technique has the disadvantage of being a batch type process. The material to be compacted is extremely heavy because the major part of the dough is, of course, a particulate stone type material. Oscillating pressure plates have the same disadvantage of only allowing one batch of dough to be compacted at any one time.

It was with some surprise, therefore, that we found that the problem could be overcome by application of compacting pressure from a roller which reciprocates along a certain length of a conveyor belt whilst sheeting material was carried beneath the roller.

We have found the present application provides an apparatus which allows the stone sheeting materials to be made and compacted in a continuous process thus reducing handling problems.

SUMMARY OF THE INVENTION

The present invention provides an apparatus for preparing a sheet material from a homogeneous mass of resin, fibrous and particulate material, which apparatus comprises, in combination, a. an endless conveyor belt having means to drive the conveyor belt past the following stations in succession;

b. a depositing station to supply the material evenly onto the conveyor belt;

c. a compression station comprising at least one nip roller to compact the material on the belt surface;

d. a compacting station comprising
   i. a moveable carriage which is reciprocable relative to the conveyor belt in a direction longitudinal to the movement of the conveyor belt;
   ii. a support plate beneath the conveyor belt;
   iii. plurality of rollers mounted on the carriage for rotation about an axis transverse to the direction of movement of the belt; and
   iv. pressure means to move the roller towards the support plate to compress the material as the carriage is reciprocated; and e. a station from which compacted material is removed from the conveyor belt.

The present invention also provides a method of preparing a sheet material from a homogeneous mass of resin, fibrous and particulate material, which method comprises; continuously depositing a fluffy mass of the material onto a continuously moving belt conveyor which conveys the material first beneath a plane cylindrical nip roller to compress the material and then beneath at least one plane cylindrical pressure roller; reciprocating the pressure roller in a longitudinal direction with reference to the moving conveyor belt and in a plane parallel to the plane of the conveyor whilst applying pressure between the pressure roller and a support plate beneath the conveyor belt; whereby the material is rolled out and compacted; and curing the resin.

The compacting station for the homogeneous mass may comprise more than one plane cylindrical roller, e.g. four rollers having parallel axes of rotation. The rollers can be applied downwards to compact the components of the sheet material by fluid pressure means such as hydraulic or pneumatic pressure. Typical total downward forces that are applied to the components of the homogeneous mass through four 48 inch rollers having a 5 inch diameter are about 1,900 lbs. although the downward force is preferably in the range 1,700 to 3,000 lbs. This force may be greater or smaller than this range as required and according to the size and number of compaction rollers which are used. The number and variation of diameter of the rollers will necessitate different forces for compacting the sheet material.

To prevent the components of the sheet material from depositing themselves directly on to the belt conveyor, the apparatus can be provided with a means for lining the belt conveyor with a thin barrier sheet material upstream of the station for depositing the material onto the conveyor. Downstream of the distributing means, a second means is provided for lining the belt conveyor with a thin barrier sheet material. The second layer is deposited onto the top of the components after they have been laid down from the distributing means. An example of thin barrier sheet material is regenerated cellulose film.

The apparatus may have edge restraints or edge boards to prevent material from falling from the sides of the conveyor belt. The edge restraints are generally fixed or bonded to the conveyor belt according to the width of sheet material required. They may comprise upstanding rubber strips bonded to the upper surface of the conveyor belt. Generally they will be positioned parallel to each edge of the conveyor belt. In this way sheet material will be contained by the restraints. Also, when the material is compacted it tends to expand in a transverse direction. The edge restraints can be used to define the maximum transverse expansion of the sheet material.

The distributing means can be a single unit such as a kibbler. A kibbler is a unit enclosing rotatable teethed rolls or tines which are preferably intermeshing. The rolls or tines may be counter-rotatable and their axes of rotation may be parallel to one another.

The apparatus may also have a cutting roller positioned downstream of a compacting means. This allows the compacted sheet material to be suitably cut up into more convenient pieces from a continuous sheet. Also further downstream of the compacting means there can be a metering roller or rollers to determine the physical properties of the compacted sheet. Generally a series of narrow metering rollers are used across the width of the compacted material. The rollers have small heads each with its own thickness sensing device. Three rollers may be used and a pen trace record is produced showing the thickness centrally and towards each edge of the compacted sheet.

The means to reciprocate the roller axis may be a driven crank, a hydraulic system or other well known driving means.

In order that the components of the sheet material may be fed to the depositing means the apparatus can include a further belt conveyor feeding the components from a suitable mixer to the distributing means.

One embodiment of the apparatus can provide a hot press for curing the compacted sheet material, the hot press being positioned around the belt conveyor. The hot press is preferably positioned downstream of the cutting roller.

DESCRIPTION OF THE DRAWINGS

FIG. 1 shows a side elevation of the compacting and sheet forming apparatus;

FIG. 2 shows a vertical elevation of the sheet forming and compacting apparatus;

FIG. 3 shows a partial cross section of the apparatus at point A—A in FIG. 2;

FIG. 4 shows a detailed side view of the compaction station; and

FIG. 5 shows a detailed view of a cross-section of the kibbler.

DESCRIPTION OF THE PREFERRED EMBODIMENTS

One embodiment of this invention will be described with reference to the accompanying drawings.

Referring to FIGS. 1 and 2 the apparatus comprises a horizontal framework 10 supporting a continuously driven steel belt conveyor 11. Conventional edge restraints are bonded to the edges of conveyor belt 11. At one end of the framework 10, there is mounted a vertical framework 12 which supports a barrier sheet material feed roll 13 and, on a crosshead, a feed conveyor 14 from a mixer (not shown). The conveyor 14 rises from adjacent the mixer and then travels horizontally towards the top of a vertical kibbler 15 mounted on a further vertical framework 16. The vertical framework 16 is attached to the framework 10 downstream of the barrier sheet material feed roll 13. On a supporting framework 17, comprising two vertical supports on either side of the belt conveyor 11 connected by a cross piece, further downstream from the vertical kibbler, a second barrier sheet material feed roll 18 is mounted. An initial compaction roller 18a is mounted beneath the feed roll 18 and acts as a guide roller for the barrier material. Moving further downstream along the conveyor 11, a supporting plate 19 is mounted on a framework 20 attached to the framework 10. Above the supporting plate 19 there is positioned a compaction carriage 21. The compaction carriage 21 comprises a train of four rollers 22 and the carriage is reciprocated horizontally by means of a driven crank 40 along a selected length of the conveyor belt 11 above the supporting plate 19. Other suitable means may also be used to reciprocate the carriage. Pneumatic or hydraulic pressure may be applied to the rollers to force them towards the belt. The conveyor belt 11 passes between the supporting plate 19 and the train of rollers 22. Some skidding of the roller or rollers 22 may occur during its reciprocating motion along the compacted material on the conveyor belt 11. This may occur especially when the roller or rollers 22 reach the end of their stroke and the direction of the carriage 21 is reversed. The roller or rollers 22 may continue in one direction as the carriage 21 starts to move away in the opposite direction. Although the skidding of the roller or rollers 22 does not seem to matter, it can be corrected by means of a toothed rack (not shown) along the side of the conveyor belt engaging a pinion wheel (not shown) attached to the axles of the roller or rollers 22. It will be understood that the compaction rollers 22 may be driven by other means in order to control their rotation during compaction of the sheet material.

The compaction station is described in further detail with reference to FIGS. 3 and 4. The axle of the roller 200 is attached to a floating frame 202 which extends across the conveyor belt 203. When more than one roller is used as in this embodiment, all the roller axles are attached to the single floating frame 202. Each side of the conveyor belt 203 has two fixing brackets 204 attached to the main bed-frame 205. The two fixing brackets 204 on each side support a horizontal cylindrical guide 206, the horizontal guide 206 being set in a plane parallel to the plane of the conveyor belt. A guided reciprocating frame 207 is slidably mounted on the guide 206 by means of two recirculating ball slide bearings 208, 209 attached to each end of the frame 207. Cross heads 210 of the reciprocating frame 207 extend across and above the conveyor belt 203. The ends of the frame 207 may extend downwards at either end of the train of rollers 200 to provide a guide for the rollers 200 and prevent longitudinal motion which is independent from the frame 207. On these cross heads 210, air rams 211 are mounted and these are adapted to apply a downward force on the floating frame 202 and hence compact the homogenous material on the conveyor belt 203 between the roller 200 and the supporting plate 213. The guided reciprocating frame is moved by means of crank 40 attached to a point 215 on the guided reciprocating frame 207.

Moving downstream further, a metering unit 23 can be provided, positioned before a knife cutting roller and side cutters 24. The metering unit 23 may comprise a roller freely supported in a side frame or a series of narrow rollers 44 positioned across the width of the conveyor belt and measuring the thickness at strategic points of the middle and towards the edges of the conveyor belt. The roller or rollers indicates the thickness of the compacted sheet. At the supply side of the knife cutting roller and side cutters 24 a take-off conveyor 25 is positioned.

With reference to FIG. 5, the vertical kibbler 15 comprises an inverted funnel-shaped casing containing a pair of rotatable multiple tines 101 and 102. The tines 101 and 102 are positioned at the top of the kibbler adjacent the funnel-shaped entrance 103. The tines 101 and 102 rotate in such a direction that material dropped between them at the point of intermeshing would be forced upwards, torn apart and carried round towards the outside of the kibbler casing dropping onto a secondary layer of tines 104, 105, 106, 107. The secondary layer of tines are also counter-rotating to facilitate the tearing action of the kibbler. The primary pair of tines are not an essential feature of the kibbler and may be omitted.

To operate the apparatus, material from the mixer is deposited on conveyor 14 where it is carried to the top of the vertical kibbler 15. A metering unit 30 immediately before the vertical kibbler determines how much material is deposited in the kibbler 15. The kibbler 15 tears apart the material by means of the counter-rotating tines.

A barrier of sheet material which may be regenerated cellulose film is guided from the feed roll 13 onto the moving conveyor 11. After being torn apart the components of the sheet material are dropped onto the conveyor lined with further barrier material and carried to the initial compaction roller 18a. A second barrier layer is deposited from the supply reel 18 onto the material. The compaction carriage 21 moves horizontally along the length of the belt conveyor above the support plate 19, while the conveyor belt carries the sheet material between the rollers and the support plate 19. The sheet material is compacted by pressure being applied downwards on the rollers and the horizontal reciprocating roller action to make it ready for its curing state. It is carried further along the belt conveyor 11 to the knife cutting roller and side cutters 24. The metering unit 23 may optionally be included. If fitted it detects the thickness of the compacted sheet material, and feeds this information to a control unit 31. The control unit 31 is connected to a further metering unit 30 on the feed conveyor 14 and to the carpet thickness sensor 31. It determines the amount of material to be supplied to the vertical kibbler ensuring that sheet material has the required thickness and density reaching the knife cutting roller and side cutters 24. A further manner of metering the amount of material to be compacted is the inclusion of a constant weight device underneath the conveyor belt. This can be mounted nearer the Kibbler such that there is a smaller time delay in reaction to weight variation. Alternatively, too much material may be put onto the conveyor 14 and rotating tines above the material will return any excess material which is surplus to the requirements of thickness and density of the sheet. At this stage, the knife cutting roller and side cutters 24 cut the sheet material into convenient sizes and pass the material to a take-off conveyor 25. The take-off conveyor 25 carries the material to the curing press.

In another embodiment of this invention the curing press can be mounted on the framework 10 and the conveyor 11 passes through the curing press so that the end product from the conveyor 11 is cured compacted sheet material.

We claim:

1. An apparatus for preparing a sheet material from a homogeneous mass of resin, fibrous and particulate material, which apparatus comprises, in combination, a. an endless conveyor belt having means to drive the conveyor belt past the following stations in succession;
   b. a depositing station to supply the material evenly onto the conveyor belt;
   c. a compression station comprising at least one nip roller to compact the material on the belt surface;
   d. a compacting station comprising
      i. a movable carriage which is reciprocable relative to the conveyor belt in a direction longitudinal to the movement of the conveyor belt;
      ii. a support plate beneath the conveyor belt;
      iii. a plurality of rollers mounted on the carriage for rotation about an axis transverse to the direction of movement of the belt; and
      iv. pressure means to move the roller towards the support plate to compress the material as the carriage is reciprocated; and
   e. a station from which compacted material is removed from the conveyor belt.

2. An apparatus as claimed in claim 1 wherein feed means for thin-barrier sheet material for lining the conveyor belt is mounted upstream of the depositing station.

3. An apparatus as claimed in claim 2 wherein a second feed means for thin-barrier sheet material for lining the material on the conveyor belt is mounted down stream of the depositing station.

4. An apparatus as claimed in claim 1 wherein the depositing station comprises at least one pair of counter-rotating intermeshing tines.

5. An apparatus as claimed in claim 1 wherein there is crank means to reciprocate the moveable carriage.

6. An apparatus as claimed in claim 1 wherein there is, at the station to remove the compacted material from the conveyor belt, a cutting means to cut the continuous sheet.

7. An apparatus as claimed in claim 1 wherein a metering station comprising a series of narrow rollers arranged transversely across the compacted material connected to thickness sensing devices, is situated downstream of the compacting station.

8. An apparatus for preparing a sheet material from a homogeneous mass of resin, fibrous and particulate material, which apparatus comprises in combination a. an endless conveyor belt having means to drive the conveyor belt past the following stations:
   b. a feed means for thin-barrier sheet material for lining the conveyor belt
   c. a depositing station to supply the material evenly onto the lined conveyor belt
   d. a feed means for thin-barrier sheet material for placing lining on the deposited material, mounted downstream of the depositing station e. a compression station comprising at least one nip roller to compress the material on the belt surface f. a compacting station comprising
   i. a moveable carriage which is reciprocable relative to the conveyor belt in a direction longitudinal to the movement of the conveyor belt
   ii. a support plate beneath the conveyor belt
   iii. a plurality of cylindrical rollers mounted on the carriage for rotation about an axis transverse to the direction of movement of the belt
   iv. means to move the rollers towards the support plate to compress the material as the carriage is reciprocated; and g. a station from which compacted material is removed from the conveyor belt.

9. An apparatus as claimed in claim 8 wherein there is crank means to reciprocate the moveable carriage.

10. An apparatus as claimed in claim 8, wherein there is at the station to remove the compacted material from the conveyor belt, a cutting means to cut the continuous sheet.

11. An apparatus as claimed in claim 8 wherein a metering station comprises a series of narrow rollers arranged transversely across the compacted material connected to thickness sensing devices, is situated downstream of the compacting station.

12. An apparatus as claimed in claim 8 wherein there are edge restraints preventing the material passing over each edge of the belt which means comprises a rubber strip bonded to the surface at each edge of the conveyor belt upon which the materials to be compacted are deposited.

13. An apparatus for preparing a sheet material from a homogeneous mass of resin, fibrous and particulate material which apparatus comprises, in combination
   a. an endless conveyor belt having means to drive the conveyor belt past the following stations in succession;
   b. a feed means for thin-barrier sheet material for lining the conveyor belt,
   c. a depositing station to supply the material evenly into the lined conveyor belt which station comprises counter-rotating intermeshing tines,
   d. a feed means for thin-barrier sheet material for placing lining onto the deposited material, mounted downstream of the depositing station,
   e. a compression station comprising at least one nip roller to compress the material on the belt surface f. a compacting station comprising
      i. a moveable carriage which is reciprocable relative to the conveyor belt in a direction longitudinal to the movement of the conveyor belt;
      ii. a support plate beneath the conveyor belt
      iii. a plurality of cylindrical rollers mounted on the carriage for rotation about an axis transverse to the direction of movement of the belt.
      iv. means to move the roller towards the support plate to compress the material as the carriage is reciprocated; and
   g. a station to remove the compacted material from the conveyor belt including a cutting means to cut the continuous sheet.

14. An apparatus as claimed in claim 13 wherein the moveable carriage is reciprocatable by means of a crank.

* * * * *